United States Patent
Brondex

(10) Patent No.: US 9,496,766 B2
(45) Date of Patent: Nov. 15, 2016

(54) BOWL FOR INDUCTION MOTOR AND INDUCTION MOTOR EQUIPPED WITH SAID BOWL

(71) Applicant: SOMFY SAS, Cluses (FR)

(72) Inventor: Adrien Brondex, Domancy (FR)

(73) Assignee: SOMFY SAS, Cluses (FR)

( * ) Notice: Subject to any disclaimer, the term of this patent is extended or adjusted under 35 U.S.C. 154(b) by 253 days.

(21) Appl. No.: 14/350,260

(22) PCT Filed: Oct. 5, 2012

(86) PCT No.: PCT/FR2012/052269
§ 371 (c)(1),
(2) Date: Apr. 7, 2014

(87) PCT Pub. No.: WO2013/050722
PCT Pub. Date: Apr. 11, 2013

(65) Prior Publication Data
US 2014/0239761 A1    Aug. 28, 2014

(30) Foreign Application Priority Data
Oct. 6, 2011    (FR) ...................................... 11 59041

(51) Int. Cl.
| | |
|---|---|
| H02K 5/00 | (2006.01) |
| H02K 1/04 | (2006.01) |
| H02K 5/12 | (2006.01) |
| H02K 5/04 | (2006.01) |
| H02K 5/15 | (2006.01) |
| H02K 7/14 | (2006.01) |

(52) U.S. Cl.
CPC ...... *H02K 5/15* (2013.01); *H02K 7/14* (2013.01); *H02K 2207/03* (2013.01)

(58) Field of Classification Search
CPC .................................. H02K 5/15; H02K 7/14
USPC .............. 310/88–88, 91, 43, 400, 402, 88-8
See application file for complete search history.

(56) References Cited

U.S. PATENT DOCUMENTS

| | | | | |
|---|---|---|---|---|
| 3,002,119 A | * | 9/1961 | Lindstrom | .................... 310/260 |
| 4,197,476 A | * | 4/1980 | Lund et al. | .................... 310/260 |
| 2010/0244602 A1 | * | 9/2010 | Perret et al. | ..................... 310/90 |

FOREIGN PATENT DOCUMENTS

| | | |
|---|---|---|
| DE | 4139984 A1 | 6/1993 |
| EP | 0184724 A2 | 6/1986 |

(Continued)

OTHER PUBLICATIONS

International Search Report issued Nov. 26, 2012 re: PCT/FR2012/052269; citing: US 2010/244602 A1, EP 1 345 307 A2, EP 0 406 431 A1 and EP 0 410 933 A1.

(Continued)

*Primary Examiner* — Jose Gonzalez Quinones
(74) *Attorney, Agent, or Firm* — Cantor Colburn LLP

(57) ABSTRACT

This bowl (10) for an induction motor intended to be housed in the hollow body of a substantially longitudinal actuator for winding/unwinding sheets, screens, blinds or roller shutters, comprises an outer skirt (12) and an inner skirt (13), the outer skirt (12) and the inner skirt (13) defining, between them, a space (14) intended to receive a lead-out of a stator of the induction motor. Moreover, the inner skirt (13) is capable of being deformed in such a way as to restrict the space (14) between the inner skirt (13) and the outer skirt (12) in order to allow the insertion into the inner skirt (13) of means of supporting a rotor assembly.

11 Claims, 4 Drawing Sheets

(56) References Cited

FOREIGN PATENT DOCUMENTS

| EP | 0406431 | A1 | | 1/1991 |
|---|---|---|---|---|
| EP | 0410933 | A1 | | 1/1991 |
| EP | 1345307 | A2 | * | 9/2003 |
| EP | 2237396 | A1 | | 10/2010 |

OTHER PUBLICATIONS

International Search Report issued May 3, 2013 re: PCT/FR2012/052270; citing: EP 2 237 396 A1, EP 0 410 933 A1, EP 0 184 724 A2 and DE 41 39 984 A1.

* cited by examiner

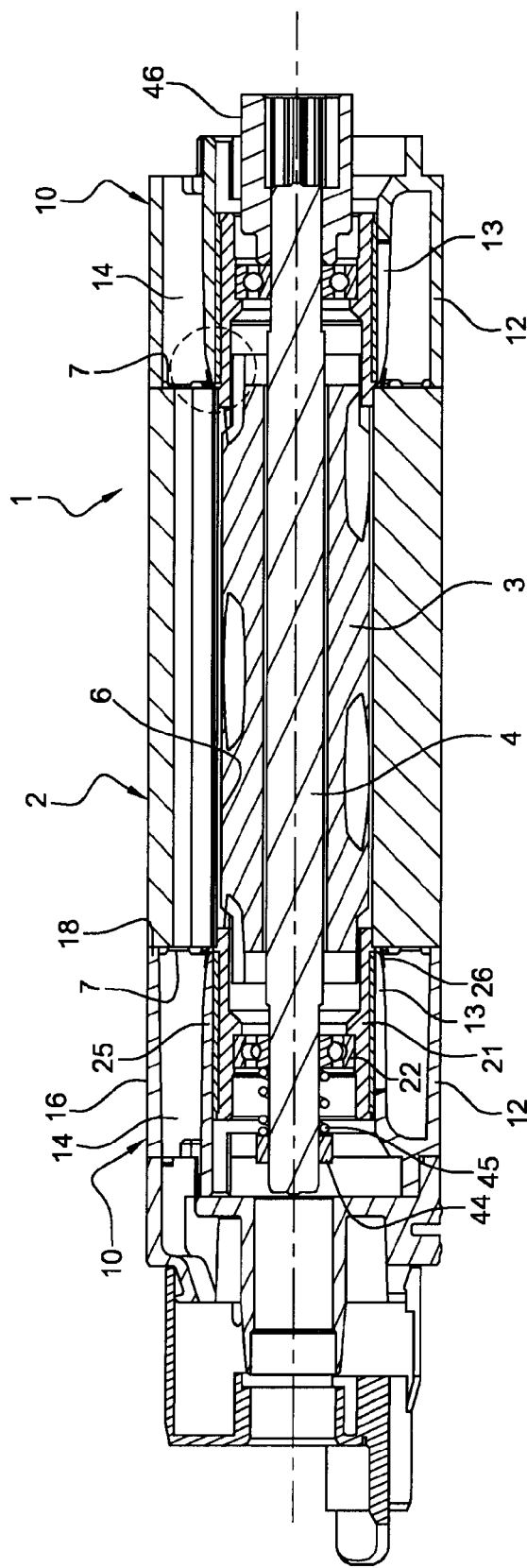
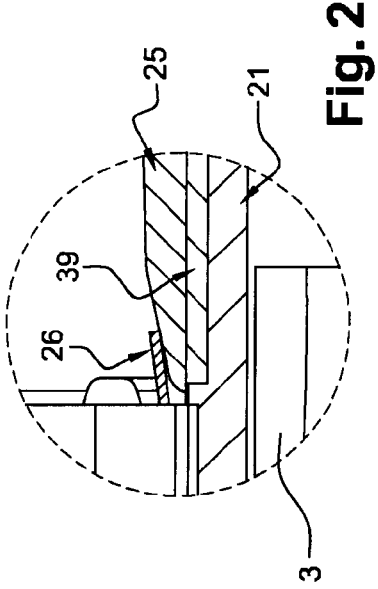
Fig. 1
Fig. 2

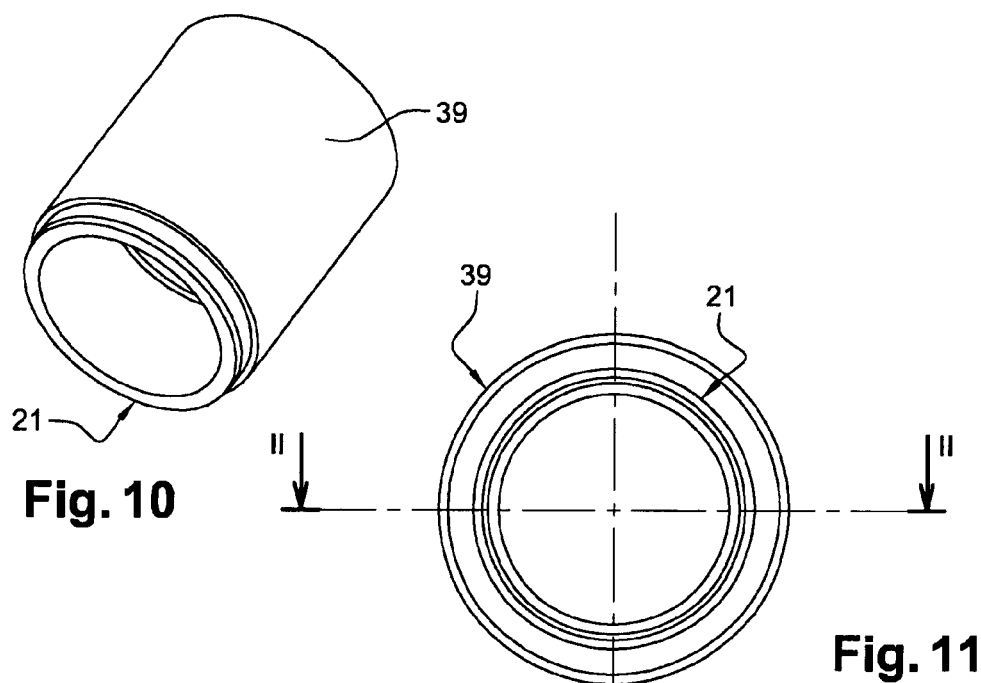
Fig. 10
Fig. 11
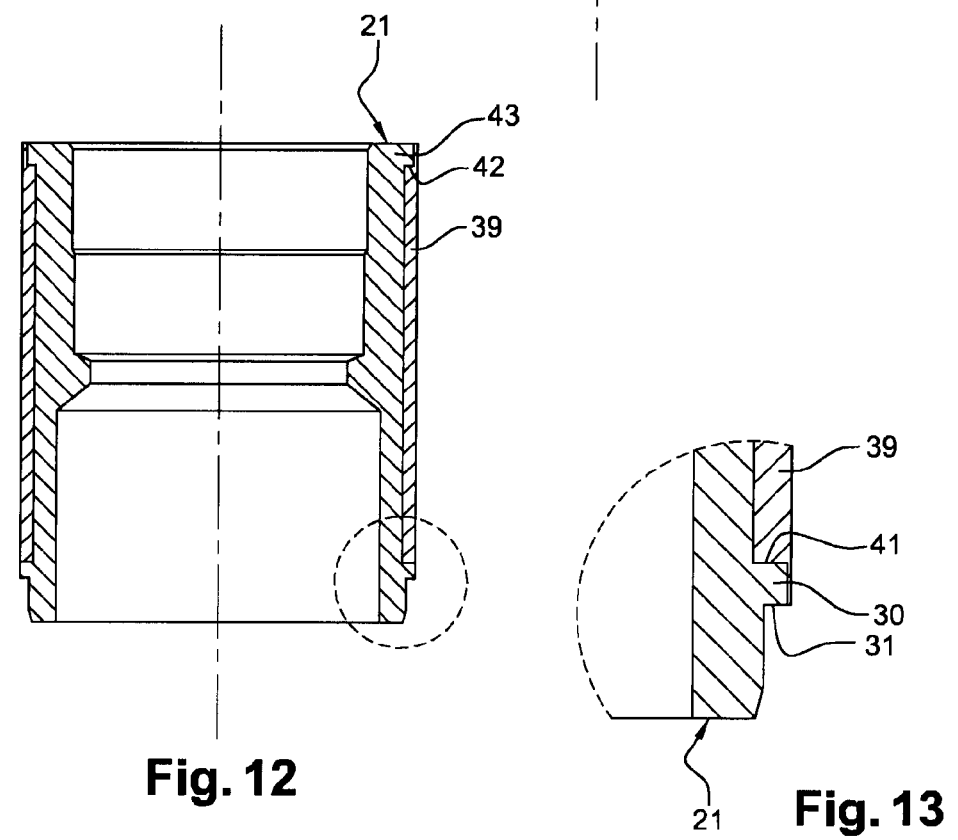
Fig. 12
Fig. 13

BOWL FOR INDUCTION MOTOR AND INDUCTION MOTOR EQUIPPED WITH SAID BOWL

TECHNICAL FIELD

The present invention relates to an induction motor, designed to be placed within a tubular actuator for home automation applications, allowing in particular winding or unwinding of cloths, screens, blinds or roller shutters.

BACKGROUND

Induction motors conventionally comprise a stator having a bore within which is disposed a rotor. The stator comprises teeth regularly distributed on its inner wall and separated by slots. The teeth hold coils that extend within the slots. The coils allow the establishment of a rotating magnetic field causing rotation of the rotor. The whole of the coils form the winding.

A part of the winding conventionally forms a projection beyond the ends of the stator. These projections are called heads of winding or coil ends. Their deterioration, during or after assembling, may cause the dysfunction of the motor. It is also important to protect the coil ends for the motor reliability.

It is known to protect the coil ends by, for example, a protection member which prevents their contact with the rotor shaft. However, the protection offered is generally incomplete; only a part of the coil ends is actually protected. Moreover, even though a protection is secured for the operating of the motor, during the assembly of the motor, the coil ends may remain uncovered, thus exposed to injury risks during the assembly of the components.

Finally, it is desirable that the motors designed to be housed in actuators for home automation applications emit the less possible noise for the comfort of the users. These motors therefore tend to be equipped with rotor support and guiding members placed the nearest to the latter (to limit the eccentricity of the rotor in the stator bore). Consequently, the localization of these support and guide members, the nearest to the rotor and at the immediate neighborhood of the coil end, is a source of supplementary injury risks for the coil ends. Alternately, the deterioration of the coil ends by the bowl itself during its mounting is also a risk.

BRIEF SUMMARY

The invention aims at overcoming all or part of these drawbacks by providing a bowl capable of protecting a coil end and an induction motor comprising this bowl, efficiently reconciling the imperatives of the noise reduction and of coil ends protection, during and after the assembly of its components.

To that end, provided is a bowl for an induction motor designed to be housed within the hollow body of an actuator substantially longitudinal for the winding and the unwinding of cloths, screens, blinds or roller shutters, characterized in that the bowl comprises an outer skirt and an inner skirt, the outer skirt and the inner skirt delimiting a space therebetween designed to receive a coil end of a stator of the induction motor, and in that the inner skirt is able to be deformed so as to restrict the space between the inner skirt and the outer skirt in order to allow the insertion of means of support of a rotor assembly within the inner skirt.

Therefore, a bowl according to the invention provides a protection space of a maximum opening when it is mounted against the stator of the induction motor, what allows an easy insertion of the coil end in this space. The later mounting of the support means of the rotor assembly, for example a bearing, within the inner skirt of this bowl, causes the deformation of this inner skirt. This deformation of the inner skirt leads to a restriction of the space within which the coil end is found. The latter is carefully pushed back, but remains protected from the support means during their implementation and after this implementation.

According to another characteristic of the bowl according to the invention, the inner skirt has a substantially frustoconical shape.

According to another characteristic of the bowl according to the invention, the inner skirt is split by a plurality of notches which delimit therebetween tabs able to flex when the support means are inserted in the inner skirt.

According to still another characteristic of the bowl according to the invention, it has a basis from which the outer skirt and the inner skirt extend, such that the bowl forms only one and same piece.

According to another aspect of the present invention, it includes an induction motor, capable of being housed within the hollow body of a substantially longitudinal actuator for the winding and the unwinding of cloths, screens, blinds or roller shutters, characterized in that the motor comprises:
a stator,
a rotor assembly
a bowl having the aforementioned characteristics,
support means of the rotor assembly, allowing the rotation of the rotor assembly with respect the stator, located within the inner skirt of the bowl,
the inner skirt being able to radially deform when the support means are inserted in it.

Thus, the induction motor according to the invention provides a complete protection of the coil end, during and after the assembly of the components of the motor, while allowing the placement of the support means of the rotor at the nearest of the latter to reduce the noise emitted.

Advantageously, a free end of the inner skirt delimits, at rest, an edge having a diameter lower than the diameter of a central bore of the stator.

Therefore, the edge delimited by the free end cannot hit the coil end (which mainly extends between the inner wall and the outer wall of the stator) upon mounting of the bowl against the stator.

According to an execution form, the support means comprise an outer rib, the diameter of which being higher than the diameter of a central bore of the stator.

According to an embodiment, the inner skirt is split by a plurality of notches which delimit there between tabs and the number of tabs is equal to the number of stator notches of the stator designed to receive a winding.

Therefore, it is possible to place each tab in the extension of one of the teeth delimited by the stator notches. This limits the risk that the coil end passes partially through the notches of the inner skirt.

In an advantageous manner, the outer skirt comprises a plurality of legs shaped to be inserted in recesses arranged on the outer lateral wall of the stator.

This allows lowering the risks of relative movement between the bowl and the stator.

Advantageously, the motor comprises an electrically insulating member put between the inner skirt and the support means.

Therefore, the risks of short circuits due to a possible contact between the coil end and a member of the electrically conducting motor are limited.

According to another aspect of the present invention, it also has a substantially longitudinal electromagnetic actuator for the winding/unwinding of cloths, screens, blinds or roller shutters characterized in that it comprises an induction motor having the aforementioned characteristics, a hollow body, and in that the outer skirt of the bowl of the motor has a bearing seating adapted to come into abutment against an inner wall of the hollow body of the substantially longitudinal actuator.

Therefore, the risks of relative movement between the bowl and the hollow body of the longitudinal actuator are substantially reduced.

BRIEF DESCRIPTION OF THE DRAWINGS

These characteristics and others of the present invention, as well as their advantages, will clearly show up from the following description of an embodiment of an induction motor according to the invention, given as a non limitative example, by referring to the attached drawings in which:

FIG. 1 shows an induction motor according to a particular embodiment of the invention, FIG. 2 shows a detail of FIG. 1, FIGS. 3 and 4 are perspective views of a bowl equipping an induction motor according to an embodiment of the invention, FIG. 10 is a profile view of an assembly comprising a bearing and an insulating member designed to equip an induction motor according to an embodiment of the invention, FIG. 11 is a view from above of the assembly comprising a bearing and an insulating member designed to equip an induction motor according to an embodiment of the invention, FIG. 12 is a sectional view according to line II-II of FIG. 11

FIG. 13 is a detail of FIG. 12.

DETAILED DESCRIPTION

Figure 3:
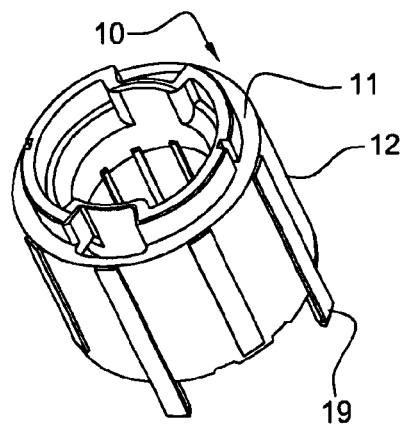

FIG. 1 shows an induction motor 1 according to a particular embodiment of the invention. The motor 1 may rotate in two directions of rotation. It comprises in particular a stator 2 and a rotor assembly. The rotor assembly comprises a rotor 3, for example of squirrel-cage type. The rotor 3 is attached to a shaft 4.

The motor 1 is designed to be inserted in the hollow body of a substantially longitudinal actuator (not represented). This actuator is designed to be, horizontally fixed to a building, and to serve for home automation applications, for example the winding/unwinding of cloths, screens or roller shutters. Thus, the motor 1 is in a substantially tubular form. In other words, the length of the stator 2 is generally greater than its outer diameter.

The stator 2 can comprise a stator lamination stack forming a central bore 6. The rotor is put within the central bore 6.

The stator 2 is centered within the hollow body of the longitudinal actuator.

The stator 2 comprises, on its central bore 6 circumference, a plurality of grooves (not visible) axially extending and leading into each end 7 of the stator 2. These grooves are also called stator notches.

The stator notches delimit therebetween teeth (not visible) around which coils are wound. The assembly of coils forms the winding.

A part of the winding generally extends beyond the ends 7 of the stator 2, and form protrusions or projections called coil ends. Therefore, the stator 2 has at each end 7 a coil end (not represented). In order to prevent the dysfunction of the motor 1, the coil ends must be protected and isolated.

The motor 1 comprises means of protection for each coil end. In the example of FIGS. 1 to 5, the means of protection comprise a bowl 10 forming a protective housing. In the embodiment illustrated in the different figures, the bowl 10 has a base 11 from which extend an outer skirt 12 and an inner skirt 13, such that the bowl 10 forms an only and same piece.

According to an embodiment, the bowl 10 can be formed in two distinct pieces designed to be assembled, one of these pieces comprising the outer skirt 12 and the other comprising the inner skirt 13.

The outer skirt 12 and the inner skirt 13 delimit a space 14 therebetween, in which extends each coil end. The motor 1 represented in FIG. 1 comprises two bowls 10, at each end 7 of the stator 2. Both bowls 10 are similar, and are symmetrically disposed about the stator 2. The bowls 10 can be realized with a deformable flexible or rigid insulating material. In particular, the inner skirt 13 is deformable under the action of a centrifugal radial effort.

The outer skirt 12 comprises a bearing seating 16. The bearing seating 16 is shaped to come into abutment against the inner wall of the hollow body of the longitudinal actuator in which the motor 1 is designed to be inserted. In the embodiment represented in FIGS. 3 to 5, the outer skirt 12 has a cylindrical form.

Opposite to the base 11, the outer skirt 12 has an edge 18 designed to come into abutment against one of the ends 7 of the stator 2. According to the embodiment of FIGS. 3 to 5, the edge 18 comprises a plurality of legs 19. The legs 19 extend in the extension of the outer skirt 12. Each leg 19 is shaped to be housed within a recess (not visible) provided on the outer circumference of the stator 2. Therefore, the legs 19 avoid any relative radial movement between the stator 2 and each bowl 10. Moreover, the outer skirt 12 is shaped to fit the shape of the inner wall of the hollow body of the longitudinal actuator. Thus, thanks to the outer skirt 12, the bows 10 allow centering the stator 2 in the longitudinal actuator.

Each inner skirt 13 allows the protection of a coil end during and after the assembly of the motor 1. According to the embodiment represented in FIGS. 3 to 5, the inner skirt 13 has a frusto-conical shape. The interior of the inner skirt 13 is designed to receive support means of the shaft 4. The support means may comprise a bearing 21 and rolling bearings 22 (for example ball bearings) which will be described in more details hereafter.

The inner skirt 13 is capable of deformation when the support means are implemented. During the mounting of the bowl 10 to the stator 2, the inner skirt 13 is in a rest position: it is not deformed because the support means are absent.

Consequently, the space 14 has a maximum opening. The maximum opening of the space 14 facilitates the mounting of each bowl 10 without risking hurting the coil end.

Figure 4:
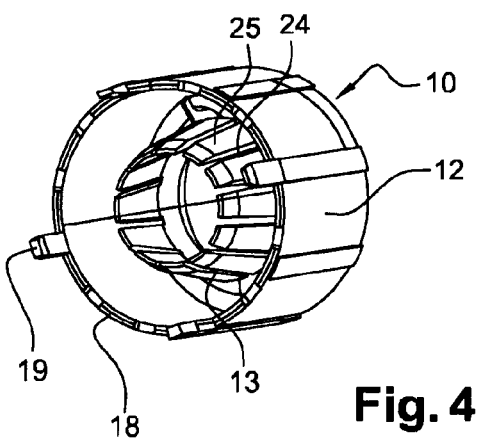
Figure 5:
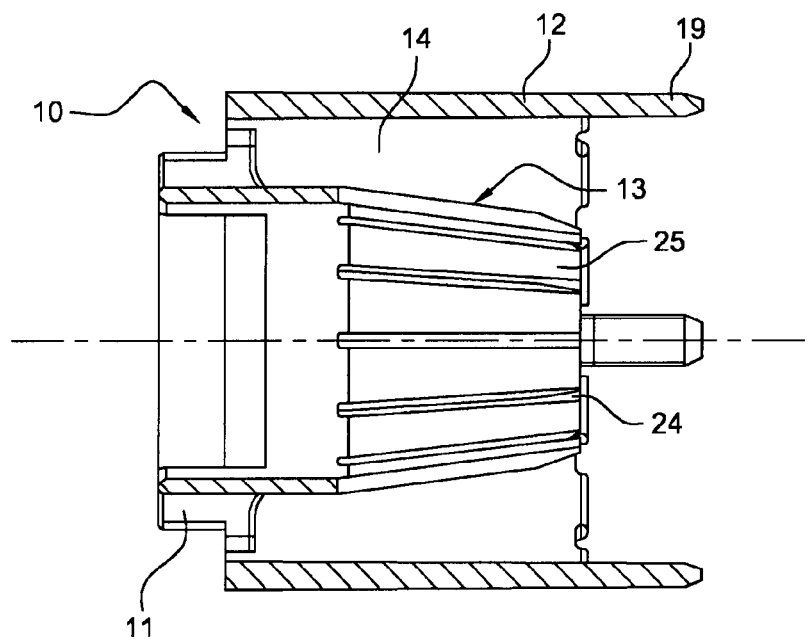
FIG. 5 is a sectional view of a bowl equipping an induction motor according to an embodiment of the invention.
Figure 6:
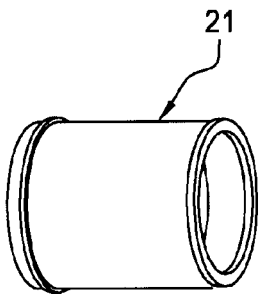
FIG. 6 is a perspective view of a bearing equipping an induction motor according to an embodiment of the invention.
Figure 7:
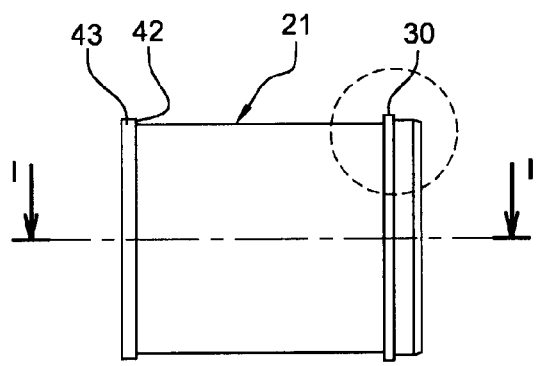
FIG. 7 is a profile view of a bearing designed to equip an induction motor according to an embodiment of the invention.
Figure 8:
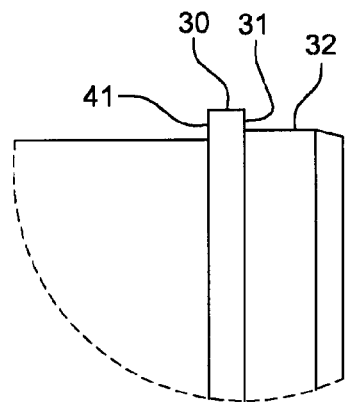
FIG. 8 is a detail of FIG. 7.
Figure 9:
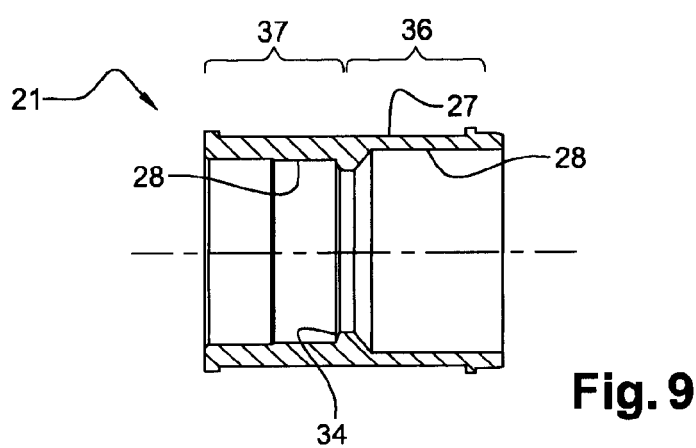
FIG. 9 is a sectional view according to line I-I of FIG. 7.

As represented in FIGS. 3 to 5, the inner skirt 13 is split by a plurality of notches 24. Two successive notches 24 delimit a tab 25 there between.

The tabs 5 have an end connected to the base 11 and a free end. They are able to be deformed when the support means of the rotor assembly are inserted in the inner skirt 13. The free ends of the tabs 25 delimit an edge of a diameter lower than a diameter of a central bore 6. The diameter of this edge is also lower than the largest exterior diameter of the bearing 21.

The motor 1 can comprise holds 26 represented in FIG. 2, disposed at each stator end 7 and designed to be used as an electrical isolation for the stator. These holds 26 should not be moved or degraded during the mounting (European and UL request of standards).

The number of tabs 25 may be equal to the number of stator notches and to the number of teeth of stator 2. If applicable, each tab 25 is disposed in the extension of one of the teeth of the stator 2. The risk that a part of a coil end passes through one of the notches 24 and be damaged is therefore lowered.

Alternately, for a same result, the inner skirt 13 is made from a shape retention memory plastic. It is thus, capable of being deformed when the support means are implemented, thus protecting the coil ends while coming into abutment on the bearing 21.

The motor 1 represented in FIG. 1 comprises two similar bearings 21, and two rolling bearings 22. The bearings 21 and the bearings 22 are symmetrically placed around the stator 2. The bearings 21 are for example made of sintered metal or machined metal.

During the insertion of the bowl 10 over the coil ends, the diameter of the free end of the inner skirt 13 being lower than the diameter of the central breading 6, the risk of axially moving the holds 26 or hurting the coil ends is very weak, even inexistent.

Each bearing 21 is then put within one of the inner skirts 13. When the bearing 21 is in the corresponding inner skirt 13, it has a substantially radial deformation. The space 14 is then restricted, but the hold 26 and the coil end have been protected during the implementation of the means of support. As a matter of fact, the free ends of the tabs 25 radially push the holds 26 and the coil ends, without axially moving them. Moreover, thanks to this configuration, the support means can be placed at the nearest of the stator 2 for a better guidance.

As it is visible on the FIGS. 6 to 9, each bearing 21 may have a substantially cylindrical shape. Each bearing 21 comprises an outer wall 27 and an inner wall 28.

The outer wall 27 comprises an annular rib 30. The annular rib 30 is arranged to form a first shoulder 31. The first shoulder 31 is designed to come into abutment against one of the ends 7 of the stator 2.

The annular rib 30 is also arranged to form a bearing seating 32. The bearing seating 32 is designed to come into abutment against the inner wall of the central bore 6.

Therefore, each bearing 21 is in direct axial abutment on the one hand, and in radial direct abutment on the other hand, against the stator. These direct abutments reduce the dimension of chain between the rotor 3 and the stator 2. They thus allow a better centering of the rotor 3 in the central bore 6. This limits the problems of noise due to the eccentricity of the rotor 3 and of the stator 2.

The inner wall 28 comprises a shoulder 34. Each rolling bearing 22 is designed to come into proximity or abutment against the corresponding shoulder 34. Normally, the gap is left when mounting between the rolling bearing and the shoulder so as to avoid the risks of degrading the rolling bearing during the implementation under constraints as well as during a possible fall of the actuator. The shoulder 34 is oriented towards the exterior, that is, opposite to the stator 2, so that the mounting of the rolling bearings 22 is performed after that of the bearings 21.

The shoulder 34 marks the boundary between a first section 36 and a second section 37 of the bearing 21. The inner diameter of the first section 36 is greater than the inner diameter of the second section 37, so that the rotor 3 partially extends in the first section 36 of each bearing 21. These different boundaries allow to secure the rigidity of the bearing 21 while accommodating the end of the rotor.

The motor 1 can comprise an electrically insulating member 39, visible for example in the FIGS. 10 to 13. The electrically insulating member 39 is designed to cover the outer wall 27 of each bearing 21 so as to prevent an electrical contact that could cause a short circuit between the coil end and an electrically conducting member of the motor 1. An electrical security may be realized by the member 39.

As it is represented in FIG. 12, the outer wall 27 of the bearing 21 can comprise a second shoulder 41, also formed by the annular rib 30, and a third shoulder 42, formed by a flange 43. The electrically insulating member 39 is shaped so as to cooperate with the second shoulder 41 and the third shoulder 42. The second shoulder 41 and the third shoulder 42 allow to axially position and maintain in position the electrically insulating member 39.

The electrically insulating member may be over-molded. It advantageously covers the annular rib 30 and the flange 43, as one can see in the FIGS. 10 to 13.

In order to block the rolling bearings 22 within each bearing 21, the motor 1 may comprise an supporting means 44 attached to an end of the rotor shaft 4, and returning means, for example a prestressed spring 45, in abutment against the supporting means 44 and tending to push the rolling bearings 22 towards the shoulder 34. At another end of the rotor shaft 4, a driving element 46, designed to cooperate with a reducer (not represented), may be tightly mounted on the shaft 4, in a possible abutment into the corresponding rolling bearings 22.

The assembly of the induction motor 1 is hereafter described.

First, the bowls 10 are placed against each end 7 of the stator 2 in order to protect the coil ends by housing them in the space 14 delimited between the outer skirt 12 and the inner skirt 13 of each bowl 10. At this step, the inner skirts 13 are not deformed. The space 14 has therefore, a maximal opening which allows the insertion of the coil ends without any danger.

Then, the support means of the rotor assembly are placed, next to the stator 2. This step therefore comprises first inserting a bearing 21 in the corresponding bowl 10, advantageously by directly pressing it against the stator 2. The placing of the bearing 21 causes the progressive deformation of the inner skirt 13 in which it is inserted. The coil end contacting the inner skirt 13 is carefully pushed back but remains protected from the bearing 21. This step also comprises the form of execution represented in FIG. 1, in inserting a rolling bearing 22 in the bearing 21, and to push the rolling bearing 22 towards the shoulder 34. It has to be noted that the bearing 21 and the rolling bearing 22 are inserted from the outside to the inside, that is, in direction of the stator 2.

Remaining is to constrain this rolling bearing 22 for maintaining it pressed in the direction of the shoulder 34, placing on the rotor 3 the support means designed to be disposed on the other side of the stator 2, then inserting the rotor 3 on which the bearing 21 has just been placed in the other bowl 10 and the central bore 6 of the stator 2. During this insertion, the bearing 21, beforehand disposed on the rotor 3, pushes the tabs 5 of the inner skirts 13 of this other bowl 10.

Of course, the invention is in no way limited to the embodiment described above, this embodiment having given as an example only. Modifications are possible, in particular, from the point of view of the constituting of the various members or by the substitution of technical equivalents, without going out from the area of protection of the invention provided.

The invention claimed is:

1. A bowl for an induction motor designed to be housed within the hollow body of a substantially longitudinal actuator for the winding/unwinding of cloths, screens, blinds or roller shutters, the bowl comprising an outer skirt and an inner skirt, the outer skirt and the inner skirt delimit a space therebetween designed to receive a coil end of a stator of the induction motor, and in that the inner skirt is able to be deformed in a manner restricting the space between the inner skirt and the outer skirt in order to allow the insertion of the support means of the rotor assembly within the inner skirt.

2. The bowl according to claim 1, wherein the inner skirt has a frusto-conical shape.

3. The bowl according to claim 1, wherein the inner skirt is split by a plurality of notches which delimit, therebetween, tabs able to flex when the support means are inserted within the inner skirt.

4. The bowl according to claim 1, wherein it has a base from which extend the outer skirt and the inner skirt, such that the bowl forms an only and same piece.

5. An induction motor, capable of being housed within the hollow body of the substantially longitudinal actuator for the winding/unwinding of cloths, screens, blinds or roller shutters, wherein the motor comprises:
   a stator,
   a rotor assembly,
   a bowl according to claim 1,
   support means of the rotor assembly, allowing the rotation of the rotor assembly with respect to the stator, located within the inner skirt of the bowl,
   the inner skirt being capable of being radially deformed when the support means are inserted in it.

6. The induction motor according to claim 5, wherein the free end of the inner skirt delimits, when at rest, an edge of a diameter lower than the diameter of the central bore of the stator.

7. The induction motor according to claim 5, wherein the support means comprise an outer rib the diameter of which being larger than the diameter of the central centering of the stator.

8. The induction motor according to claim 5, wherein the inner skirt is split by a plurality of notches which delimits tabs therebetween, and in that the number of tabs is equal to the number of stator grooves of the stator designed to receive a winding.

9. The induction motor according to claim 5, wherein the outer skirt comprises a plurality of legs shaped to be inserted in recesses arranged on the outer lateral wall of the stator.

10. The induction motor according to claim 5, wherein it comprises an insulating member located between the outer skirt and the support means.

11. A substantially longitudinal electromagnetic actuator for the winding/unwinding of cloths, screens, blinds or roller shutters, the actuator comprising:
   an induction motor according to claim 5,
   a hollow body, and in that
   the outer skirt of the bowl of the motor has a bearing seating shaped to come into abutment against the inner wall of the hollow body of the substantially longitudinal actuator.

* * * * *